Dec. 27, 1960         H. A. BURGERT         2,966,207
SPRING FRAME FOR THE UPHOLSTERY OF SEATS AND/OR BACK
RESTS MORE PARTICULARLY OF SEATS IN MOTOR VEHICLES
Filed Aug. 12, 1957         2 Sheets-Sheet 1
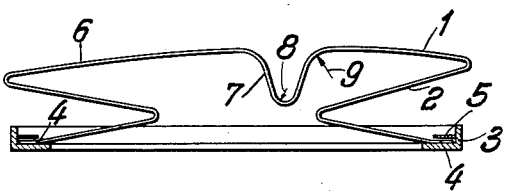
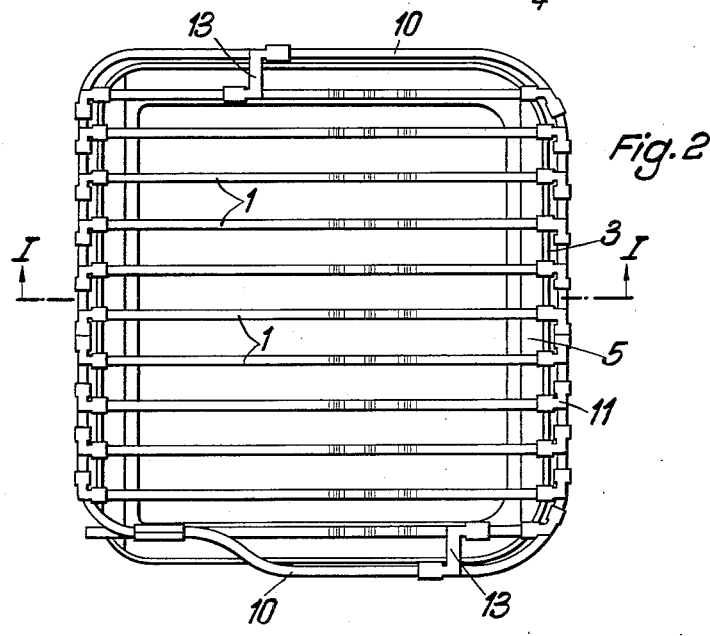
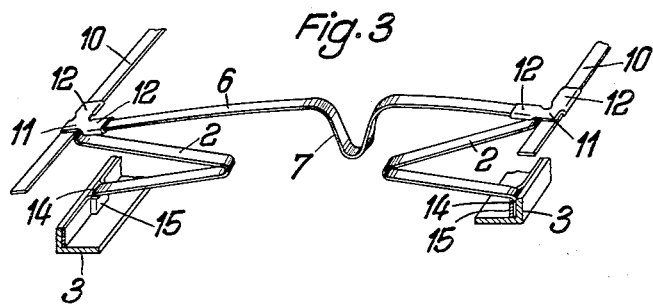
Inventor:
H. A. Burgert

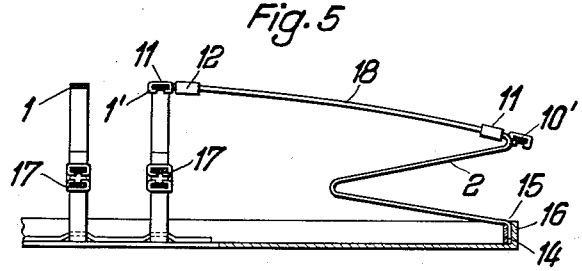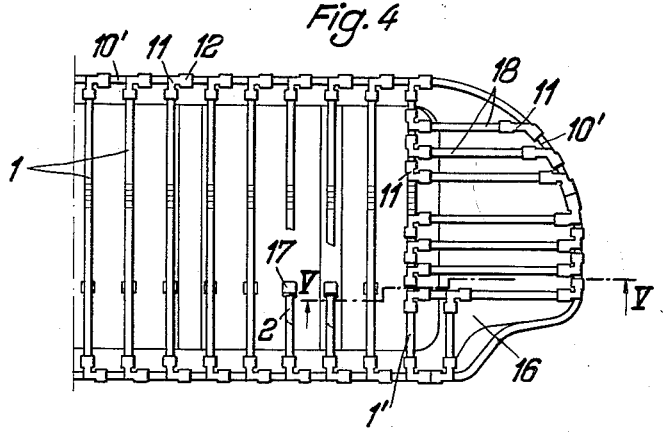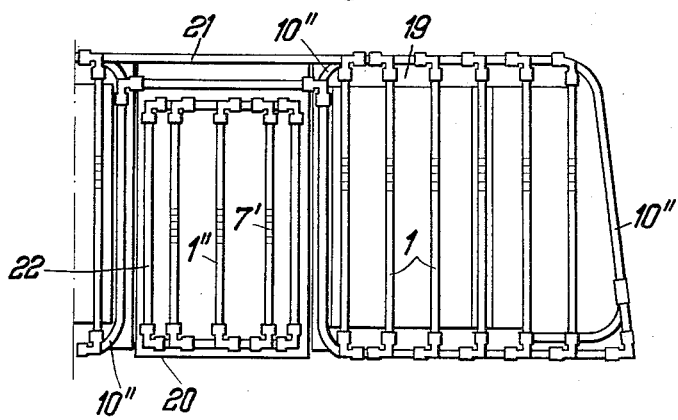

United States Patent Office 2,966,207
Patented Dec. 27, 1960

2,966,207

SPRING FRAME FOR THE UPHOLSTERY OF SEATS AND/OR BACK RESTS MORE PARTICULARLY OF SEATS IN MOTOR VEHICLES

Herbert Anton Burgert, Porza, Tessin, Switzerland, assignor to IGMA A.G., Zurich, Switzerland Filed Aug. 12, 1957, Ser. No. 677,501

Claims priority, application Germany Sept. 5, 1956

9 Claims. (Cl. 155—179)

This invention relates to a spring frame for the upholstery of seats and/or back rests more particularly in motor vehicles comprising spring-bands extending lengthwise or crosswise of the frame and having middle sections shaped to form spring hoops with a flat central outward camber with supporting arms provided at each end towards the frame.

Various forms of construction of spring frames based on the use of spring hoops are already known to the art. In one known form of construction each spring hoop consists for instance of a central section forming a fairly flat upwardly curved arch, at each end of which is a supporting arm of roughly Z shape that arcuately sweeps outwards and downwards or outwards or inwards, the free end being attached to the frame of the seat. Several such spring hoops are arranged in parallel both lengthwise and crosswise of the seat so that the entire seat consists of a latticework of intersecting hoops.

The disadvantage inherent in the crosswise interconnection of the spring hoops is that the center of the seat or of the similarly constructed back rest offers a comparatively stiff surface which, though exhibiting a certain amount of overall resilience, fails to "give" when it is locally weighted and is therefore rather hard to sit upon.

In another known spring frame the outward arch of the spring hoops has a central downwardly or inwardly reflexed portion extending roughly to the level of the outer ends of the central section and connected at its lower, i.e. inner end, with the two opposite outer ends of the central section or with the adjacent parts of the frame by means of helical spring elements. The end portions of the spring hoop beyond the ends of the central section are bent downwards roughly in the shape of a loop, the free ends being reflexed upwardly and outwardly so that the said end portions of the central section are barely raised above the level of the frame. The middle of such a spring frame which consists of parallel spring hoops all extending in the same direction provides a much softer springing than the previously described spring frame. However, it is open to the objection that two helical springs are required for each spring hoop so that the completed frame is more expensive to make besides being much more likely to develop trouble.

The present invention aims at improving the known types of spring frame of the aforesaid kind and to provide an adequately soft spring foundation for the upholstery with the simplest possible means.

Substantially the invention consists in that the center section of each spring hoop has a preferably V-shaped reflexed portion that extends inwards or rearwards into the upholstered frame without being joined to any other part of the spring assembly. A spring hoop with a reflexed center portion as described has sufficient freedom of movement for performing the desired degree of spring deflection to which furthermore the lateral supporting arms considerably contribute since these are likewise adapted to yield in the direction of the frame. This favourable distribution of the total spring deflection over the entire hoop permits additional spring elements such as helical or spiral springs as well as the provision of flexible joints of any kind to be dispensed with.

It is an advantage if the reflexed portion of the hoops projects inwardly into the region of the supporting arms so as to make contact with and bear against a bottom panel of the seat or a rear panel of the back rest when the hoops are fully deflected. In such an arrangement the hoops may be constructed to give a maximum amount of elastic deflection and thereby to provide a particularly soft and comfortable springing which is automatically strengthened by the supporting action of the central reflexed portion when the toops are heavily loaded.

Whereas in known types of spring hoop with a central V-shaped reflexed portion the V has a comparatively acute apex, bent to a rather small radius in relation to the thickness of the material and thus a source of difficulty in production, it is sufficient for the purposes of the present invention if the radii of curvature of the reflexed portion are at least four times the thickness of the spring strip used, and they may be considerably larger if desired. Moreover, whereas in known constructions of such spring hoops the reflexed portions are in the center of the hoops it is preferred according to another feature of the present invention to provide the reflexed portion in front of the middle of the hoops and in the case of back rests above their middle where the greater local loads may be expected to occur, it being understood, of course, that the hoops extend lengthwise of the seat or vertically up the back rest.

Other features of the invention relate to the conformation of the lateral supporting arms of the individual spring hoops and to a suitable interconnection of the outer edges of the middle sections of the hoops by a strip member such as an edge wire which preferably encircles the entire upholstery frame in the usual manner in the form of a wire edging frame more or less rigidly joined along the sections that are parallel with the spring hoops with the neighbouring hoops by means of one or several stiffening members. Furthermore, locally varying specific loads to which the upholstery is likely to be subjected may be taken into consideration in designing a spring frame for a seat or a back rest by suitably spacing the individual hoops and by suitably adapting their elastic characteristics to these requirements by employing material of different gauge.

Further particulars and features of the invention relating inter alia to the application of the invention to the provision of a central arm rest associated with an upholstered back, to a special form of construction of an upholstered seat for several persons, and finally to convenient means of creating the joints and fastenings between individual elements, will be hereinafter described with reference to several embodiments illustrated in the accompanying drawings in which:

Figure 1 is one form of construction of an upholstered seat shown in a section taken on the line I—I in Figure 2;

Figure 2 shows the upholstered seat illustrated in Figure 1 when viewed from above;

Figure 3 is a partial view of another spring frame similar in construction to the first example, seen in perspective at an angle from above;

Figure 4 is a partial view from above of an upholstered seat as illustrated in the previous figure;

Figure 5 is a part section of the upholstered seat shown in Figure 4, the section being taken on the line V—V in Figure 4; and Figure 6 is a partial front view of a third illustrative embodiment of a back rest with a likewise upholstered central arm rest.

The upholstery spring frame shown in the first embodiment in Figures 1 and 2 comprises spring hoops 1 arranged in parallel lengthwise of the seat and held between supporting arms 2 secured with their free ends to the frame 3 of the upholstered seat. Each supporting arm is held in a horizontal pocket 4 provided on the frame of the seat. The series of neighbouring pockets 4 are formed by a strip member 5 on the horizontal part of the frame and secured to the frame 3 between the individual supporting arms 2 for instance by spot welds and slightly lipped at the points of attachment of the supporting arms to facilitate their insertion into the pockets.

The centre section of each spring hoop member 1 has a generally outwardly arched conformation and is provided towards the front of the seat immediately in front of the hoop centre with a V-shaped reflexed portion 7 extending into the vicinity of the supporting arms 2 and having radii of curvature 8, 9 at the apex of the V as well as at the points of inflexion out of the general contour of the centre hoop section 6 that are at least seven times as long as the thickness of the spring bands.

Each of the supporting arms is bent into the shape of a letter Z of which the middle part projects under the center section of the associated hoop to the extent of about one third of the length of the latter, whereas the adjoining free leg points outwards for attachment to the edge of the frame 3 in the manner already described.

As will be seen more particularly by reference to Figures 2 and 3 the outer ends of the center sections of the individual spring hoops 1 of the spring frame are interconnected by an edge wire consisting of steel strip material which encircles the entire assembly in the form of a closed ring-shaped wire frame 10 (in Figure 1 this wire frame is not shown merely to avoid complicating the drawing). This wire frame 10 is attached to each spring hoop 1 by means of a sheet iron angle 11 of which each shank carries a sleeve 12, one for holding the wire frame 10 and the other for rigidly embracing the edge of the center section 6 of the spring hoop 1. Furthermore, in the region of those two opposite sides of the frame 3 of the seat which are parallel with the hoops 1, the wire frame is additionally attached to the adjacent spring hoop 1 by a stiffening member 13 constructed in the same way as are the above described sheet metal angle pieces 11.

Figures 1 to 3 clearly show that a seat having an upholstery spring frame as described will be softly sprung and that the resilience of its springing can adapt itself to locally varying loads in such a manner that its elasticity is maintained even when the spring deflections are considerable. A certain degree of "give" will still be in evidence even when the reflexed portions 7 of the center sections of the relative spring hoops bear down into contact with a fixed bottom panel (not shown) under the seat because when this is the case the hoops can still elastically yield by pushing the shanks of the V-shaped reflexed portion further apart. Since the center sections 6 of the spring hoops inside the wire frame 10 are independent the one from the other, those center sections 6 of the individual spring hoops 1 which are not subject to load will remain in their more or less unstressed normal position and therefore impart to the entire seat an excellent lateral stability providing adequate contact between the seated passenger and the vehicle and conveying a definite "feel" for the position of the vehicle on the road despite the general softness of the springing. The disconcerting sense of "floating" on the upholstery inside the vehicle which gives especially the driver a sense of insecurity in his handling of the vehicle will not be created by a seat constructed as hereinbefore described which therefore provides a particularly suitable type of upholstery springing for drivers' seats.

The spring frame shown in Figure 3 differs slightly from that illustrated in Figures 1 and 2 in that the free ends 14 of the individual supporting arms 2 have an additional downwardly angled extremity by means of which they are held in vertical pockets 15 on the inside edge of the frame.

Figures 4 and 5 illustrate an adaptation of a spring frame in this modified form to a seat for several passengers seated side by side such as the back seat in a motor vehicle, the drawings showing a view from above and a section of one half of the springing for such a seat. It will be clearly seen by reference to these drawings that in substance this application of the springing conforms with that of the first above described embodiment excepting that the extremities of the free ends 14 are angled in the downward direction—as shown in Figure 3—and that they engage appropriate pockets 15 in the frame 16. Another slight difference is that at the rear of the seat the supporting arms 2 of the spring hoop members 1 are reinforced at their forward elbow ends by means of sleeve cappings 17 which serve to prevent the rear part of the upholstery from tilting downwards should a person sit down well into the back of the seat.

Unlike the spring arrangement shown in the first form of construction, Figures 4 and 5 show half-length hoops 18 disposed crosswise of the seat at the ends of the two outer spring hoops 1' and extending to the side members of the frame 16 of the seat, the outer supporting arms 2 of the said half-length hoops being attached to the side members of the frame 16 at these points. This form of construction imparts a greater degree of rigidity to the opposite ends of the wide seat and prevents these more frequently used parts of the seat from "sagging" besides reducing the permissible deflection which at the seat ends may be limited by the presence of the boxes for the road wheels. The individual half-section hoops 18 are attached to the above described spring hoops 1' by means of similar sheet iron angles 11 as are used for fastening the wire frame 10' of this seat to the center sections of the individual spring hoops 1, 1'. The wire frame 10' at the same time links together the outer edges of the spring hoops 18 in the same way.

An upholstery spring foundation corresponding to Figure 6 but applied to the back of such a seat likewise substantially consists of spring hoops 1 comprising rearwardly reflexed portions which are provided above the middle of the roughly vertically extending spring hoops 1. In this instance the free ends (not shown) of the Z-shaped supporting arms are inserted into pockets on the frame 19 of the back rest inside the plane of the frame. The back rest shown in Figure 6 incorporates a central arm rest 20 which can be tipped down out of the plane of the back of the seat into a horizontal position to serve as an arm rest for the two passengers seated on either side thereof. Consequently, a wire frame 10" encircling the spring hoops 1 is of substantially two part construction, the two halves being connected together above the central arm rest 20 merely by an additional length of spring wire 21.

Figure 6 also discloses that the central arm rest 20 is sprung by means of three slightly smaller spring hoops 1" extending lengthwise thereof, the outer margins of the center sections of these spring hoops being encircled by a wire frame 22 of their own. These spring hoops 1" are likewise provided with central reflexed portions 7' and the free ends of their supporting arms are held in pockets of the arm rest. Incidentally, the wire frame 10" provides a certain amount of springing at the lateral edges of the back rest where the frame of the back rest is cut away for structural reasons.

The invention is not intended to be limited to the illustrative examples that have been described. For instance one and the same seat or one and the same back rest might incorporate spring hoops of different elastic characteristics for instance by having different cross sections to adapt them to locally different specific loads to which the spring upholstery is likely to be subjected. The springing can also be adapted to locally differential loads by varying the spacing between the spring elements in such a manner that they are spaced more closely together where the surface is likely to be subjected to heavier loads and more widely apart where the load is expected to be less.

Instead of connecting the individual structural elements of the spring assembly by means of sheet metal angles or sleeves the joints might alternatively be secured by spot welding or by means of adhesives. Furthermore, instead of making the spring hoops of steel strip they might conveniently consist of some suitable plastic material based for instance on one of the conventional copolymerisation products.

I claim:

1. In a spring frame assembly for upholstered articles, particularly for use in motor vehicles, comprising a substantially flat frame having at least two opposite edges, a plurality of flat outwardly curved spring bands extending between said two opposite edges of said frame, said edges each including a flange perpendicular to the plane of the frame in the direction of the upholstery for the article, a V-shaped supporting arm at each end of each band with the vertex of each arm being directed toward the interior of the assembly, pockets on the frame along said edges thereof for receiving the free ends of said supporting arms and securing the same to the frame, and a V-shaped deflection for each spring band outside the mid-part thereof and projecting to substantially the plane of the vertex of the V-shaped supporting arms when the respective bands are in the unstressed condition.

2. A spring frame assembly as claimed in claim 1, and wherein the upholstered article is a seat with the deflection in each spring band being in front of the mid-part of each spring band.

3. A spring frame assembly as claimed in claim 1, and wherein the upholstered article is a back rest, with the deflection in each spring band being located above the mid-part of the spring band.

4. A spring frame assembly as claimed in claim 1, in which said pockets are located on the flange of each of said opposite edges.

5. A spring frame assembly for an upholstered rear seat particularly for use in motor vehicles, comprising a substantially flat frame having opposite side edges and front and rear edges respectively, a plurality of flat outwardly curved spring bands extending between the opposite front and rear edges of said frame, said front and rear edges each including a flange perpendicular to the plane of the frame in the direction of the upholstery of the seat, half spring bands extending perpendicularly to said spring bands at each outer side of the frame and connected respectively to each outermost spring band, a V-shaped supporting arm at each end of each spring band and each half spring band, and means securing the free ends of the supporting arms of said spring bands and said half spring bands to the opposite front and rear and side edges respectively.

6. A spring frame assembly as claimed in claim 5, wherein the means securing the free ends of the supporting arms comprises pockets provided along the edges of the frame for receiving said free ends of the supporting arms of said spring bands and half spring bands.

7. A spring frame assembly as claimed in claim 5, wherein the vertex of each of said V-shaped supporting arms is directed toward the interior of the assembly and each spring band being provided with a V-shaped deflection outside the mid-part thereof and projecting to substantially the plane of the vertex of said V-shaped supporting arm when such spring bands are in the unstressed condition.

8. A spring frame assembly as claimed in claim 5, wherein said V-shaped supporting arms of each spring band extend for approximately one-third of the length of the spring band beneath the spring band.

9. A spring frame assembly as claimed in claim 5, wherein said V-shaped supporting arm of each half spring band extends for approximately one-half of the length of the half spring band beneath such band.

References Cited in the file of this patent

UNITED STATES PATENTS

| | | |
|---|---|---|
| 2,127,558 | Freund | Aug. 23, 1923 |

FOREIGN PATENTS

| | | |
|---|---|---|
| 20,251 | Great Britain | 1889 |
| 720,707 | France | Dec. 12, 1931 |
| 737,658 | Germany | July 13, 1943 |
| 959,049 | France | Sept. 21, 1949 |
| 1,090,627 | France | Oct. 20, 1954 |